United States Patent Office 3,507,663
Patented Apr. 21, 1970

3,507,663
SOUR CREAM
Samuel L. Starook, Arlington Heights, and Edwin G. Stimpson, Northbrook, Ill., assignors to Kraftco Corporation, New York, N.Y., a corporation of Delaware
No Drawing. Filed Dec. 12, 1966, Ser. No. 600,778
Int. Cl. A23c 9/12, 13/12
U.S. Cl. 99—54                                    6 Claims

ABSTRACT OF THE DISCLOSURE

Sour cream is produced by a method wherein acidification is effected by direct addition of an edible acid, such as lactic acid. The acidified sour cream is heat treated after acidification and is stabilized by the addition of particular stabilizing mixtures comprising gelatin and pectinous material.

---

The present invention relates to dairy products. More particularly, the present invention relates to an improved stabilized sour cream and to a method of producing the same.

Sour cream is a smooth, viscous, acidified dairy product which is generally made by pasteurizing and homogenizing a light cream and then ripening the cream to provide a desired level of acidity. In a conventional procedure for manufacturing sour cream a sour cream mix is inoculated with a lactic acid-producing starter culture and is incubated, usually at 70° F. for a period of about 15 hours and is then packaged at 70° F. and placed immediately into a cooling room, at 40° F. Such procedure requires bacterial culture maintenance, preparation of starters and lengthy incubation times. There are other problems such as the presence of inhibitory substances which slow down acid development, and difficulty of acidity control in the finished product. Moreover, the conventional product has a short shelf life, and flavor defects frequently develop during storage, such as excessive acid taste, oxidized and unclean off flavors, bitterness and cheesiness.

One method for developing acidity to produce sour cream with improved control of acidity is disclosed in British Patent No. 986,940 to Battelle Development Corporation. In accordance therewith, an edible organic or inorganic acid is added directly to the sour cream mix at a level sufficient to produce the desired acidity. While the direct addition of an edible organic or inorganic acid to produce the desired acidity for a sour cream product provides improved control over the final pH of the product, there remains a tendency for whey to separate, i.e., "whey off," from the curd upon standing.

This tendency for wheying off in sour cream is intensified when the cream is subjected to heat treatment following acidification. Such heat treatment following acidification would otherwise be desirable to provide extended shelf life. The increased susceptibility to wheying off after heat treatment may be caused by destabilization of the protein in the sour cream, resulting in flocculation-aggregation tendencies of the protein and subsequent whey expulsion. Consequently, it has not been generally feasible to produce sour cream wherein the cream has been heat treated after acidification and the Battelle does not teach such heat treatment.

However, it is known, as taught by U.S. Patent No. 3,235,387 to Stumbo, et al., to produce sour cream wherein heat treatment has been effected on the acidified cream to increase shelf life. Prior art methods for producing sour cream wherein a heat treatment is effected on the acidified cream have generally used a combination of stabilizers, such as gums and starch, for preventing whey separation. Such stabilizers, while generally effective in reducing the tendency of whey to separate from the curd, have not been completely satisfactory due to undesirable texture or flavor introduced by the stabilizers.

It is, therefore, an object of the present invention to provide an improved sour cream product. It is another object of the present invention to provide a heat-treated sour cream product wherein whey separation is substantially eliminated and which has a desirable flavor and characteristic sour cream body. It is a further object of the present invention to provide a method for preparing a sour cream product having a desired characteristic sour cream body, and heat stability whereby the acidified sour cream mix may be heat treated to provide increased shelf life.

Other objects and advantages of the present invention will become apparent from the following detailed description.

Generally, in accordance with the method of the present invention, sour cream with desirable body and resistance to wheying off is produced wherein acidification is effected by direct addition of a suitable organic or inorganic acid or acidogen and wherein the acidified sour cream mix is heat treated subsequent to acidification to provide increased shelf life. The sour cream product made in accordance with the present invention is attained by addition of particular stabilizing agents during manufacture. The stabilizing agents comprise, in combination, low methoxyl pectin and gelatin.

In the method of the present invention a sour cream base mix is first prepared containing butterfat at a level of about 20 percent and milk-solids-not-fat (MSNF) at a level of about 9 percent. It should be understood that the level of butterfat and of milk solids not fat may be varied to conform to the requirements of regional preferences or regulations. The sour cream base mix is then preferably pasteurized. Pasteurization is effected according to conventional procedures. Typical pasteurization heat treatment conditions might be 145° F. for 30 minutes or 165° F. for 30 seconds. Homogenization of the sour cream base mix at this point in processing is optional. However, the firmness of the sour cream product is related to homogenization conditions and will affect to some extent the level of addition of the stabilizing agents of the present invention. Homogenization, when used, is preferably effected at 500 p.s.i. second stage and 1500 p.s.i. first stage.

To the pasteurized and homogenized sour cream base mix is then added the stabilizing agents of the present invention. The level of addition of the stabilizing agents is related to the desired pH of the final sour cream product and, as stated above, is further related to the homogenization conditions.

In this connection, it is generally desirable to maintain the pH of the final sour cream product at a level of from between about 4.0 to about 4.5. In general, the low methoxyl pectin is used at a higher level at lower pH. The level of low methoxyl pectin will range from about .15 weight percent of the finished sour cream product at a pH of 4.5 to about .25 weight percent of the finished sour cream product at a pH of 4.1. At a particular pH the level of low methoxyl pectin may be varied upwardly to a level of about 0.50 percent by weight from the minimum level required to just stabilize the sour cream product but no particular additional advantages are obtained.

As used herein, low methoxyl pectin refers to fruit pectin which has been chemically treated to reduce the methoxyl level. Low methoxyl pectins are characterized by their ability to form gel structures in systems containing a high level of calcium and in the absence of high levels of sugars, such as sucrose. It is preferred that the low methoxyl pectin be capable of forming a gel structure over a wide pH range. A particularly preferred low methoxyl pectin is that produced by Sunkist Growers Co. and characterized as type 100.

It is preferred to add gelatin at a level of from about .2 weight percent of the finished sour cream to about .4 weight percent of the finished sour cream product. At level below the preferred range the sour cream product lacks desirable smoothness while at levels above the desired range the gelatin tends to impart a rubbery characteristic to the finished sour cream product.

The level of gelatin addition is related to the bloom value of the gelatin. In general, it is preferred to use gelatin with a bloom of 225. Although gelatin with lower or higher bloom values may be used, higher levels of addition are required for lower bloom values.

The low methoxyl pectin and the gelatin may be preblended prior to introduction into the pasteurized and homogenized sour cream base mix. The mixture of low methoxyl pectin and gelatin is preferably added slowly to the sour cream base mix while the mix is agitated. A preferred means for introduction of the stabilizing agents is through a device wherein the sour cream base mix is circulated past a funnel containing the mixture of stabilizers and a small proportion of the stabilizers is continuously introduced into a flowing stream of the sour cream base mix. The addition of the stabilizing agents is carried on over a period of about five minutes and is preferably effected at a temperature of from 90 to 110° F.

The mixture is then heat treated to provide a longer shelf life. The heat treatment also results in providing a more firm body to the sour cream product. Heat treatment may be effected at temperatures of from 155° F. to about 185° F. for periods of time of from about 30 minutes to about 5 minutes, respectively, to inactivate a substantial number of undesired microorganisms and thereby promote storage life. It will be readily understood that a suitable time-temperature relationship may be selected by one skilled in the art within the limits as described above.

During the heat treatment step a suitable edible organic or inorganic acid may also be added to provide a preselected pH. Suitable acids include lactic acid, gluconadelta-lactone, citric acid, acetic acid, melic acid and fumari acid. Lactic acid is preferred since this is the acid produced by bacteria associated with the bacterial culture process. The acid is added while the mixture is agitated and the resultant hot acidified mixture is homogenized to provide a smooth, desirable texture.

The resultant sour cream product is filled while hot into suitable containers. It is desirable to maintain the sour cream mixture at a temperature of at least about 150° F. It is also desirable to fill the hot acidified mixture into containers as soon as possible after the heat treating step has been completed. There is some tendency for the body of the sour cream product to soften if the mixture is held for any length of time at the elevated temperature.

The following example further illustrates various features of the present invention but is intended to in no way limit the scope which is defined in the appended claims.

EXAMPLE I

One hundred gallons of a sour cream base mix are prepared from the following ingredients in the indicated proportions:

| Ingredients | Weight percent | Weight percent butterfat (BF) |
| --- | --- | --- |
| Cream (40% BF, 5.4% MSNF) | 48.73 | 19.50 |
| Skim milk (8.9% MSNF) | 46.39 | |
| Condensed skim milk (40% total solids) | 4.88 | |
| Total | 100 | 19.50 |

The above fluid ingredients are combined and pasteurized at 160° F. for 30 seconds and are then homogenized in a two stage homogenizer at 500 p.s.i.g. second stage 1500 p.s.i.g. first stage. The base mix is then stored after cooling to 40–50° F. A portion of the base mix is then used to provide 100 gallons of a sour cream product according to the following composition for the finished product:

| Ingredients: | Weight percent |
| --- | --- |
| Base mix | 97.64 |
| Lactic acid, 50% | 1.30 |
| Acetic acid, glacial | .03 |
| Flavor components | 0.33 |
| Low methoxyl pectin, grade 100 | .20 |
| Gelatin, 225 bloom, type B | .30 |
| Salt | .20 |

The salt, low methoxyl pectin, and gelatin were combined as a dry blend and were added to the sour cream base mix which had been heated to a temperature of 100–110° F. The sour cream base mix was then heat treated at a temperature of 170° F. for 20 minutes. At the end of the 20 minute period the lactic acid, acetic acid and flavor components were added as a blend to the hot sour cream base mix. The final pH was 4.25.

After the acids and flavors had been added the resultant mixture was homogenized, double stage, using 1000 p.s.i.g. second stage and 3000 p.s.i.g. The sour cream product, at a temperature of 155° F., was then immediately filled into suitable containers, and the containers were sealed. The hot packaged sour cream product was held in the filling containers at room temperature for one hour prior to introduction into cold storage to reduce any tendency toward heat shock which might result in surface cracking.

The sour cream product prepared according to the above example had good taste and texture which was retained after storage at 40° F. for a period of 70 days.

EXAMPLE II

Sour cream was prepared according to the above example using the sour cream base mix wherein lactic acid was added at the level sufficient to provide a pH of 4.0. Low methoxyl pectin was added at a level of .25 percent and gelatin was added at a level of .40 percent. The resultant sour cream product had desirable texture and firmness which were retained after storage for a period of 70 days at a temperature of 40° F.

EXAMPLE III

Sour cream was prepared according to the method of Example I wherein lactic acid was added at a level sufficient to provide a pH of 4.5. Low methoxyl pectin was added at a level of .20 weight percent and gelatin was added at a level of .20 weight percent. The resultant sour cream product had a desirable body and texture and exhibited no tendency toward wheying off after a period of 70 days storage at 40° F.

What is claimed is:

1. A method for producing sour cream which comprises preparing a sour cream mix, adding to said sour cream mix from about .15 to about 0.50 percent by weight of said sour cream mix of low methoxyl pectin and from about 0.20 percent to about 0.40 percent by weight of the sour cream mix of gelatin, heating the resulting mixture to an elevated temperature from about 155° F. to about 185° F. for a time period of about 30 minutes to about 5 minutes, acidifying said mixture, homogenizing said mixture to provide a sour cream product and packaging said sour cream product while at an elevated temperature of at least about 150° F.

2. The method of claim 1 wherein said sour cream mix is pasteurized and homogenized prior to addition of said low methoxyl pectin and said gelatin.

3. The method of claim 1 wherein said sour cream mix is acidified to a pH of from about 4.0 to about 4.5.

4. The method of claim 1 wherein said sour cream mix is acidified with an edible acid selected from the group consisting of lactic acid, glucono delta-lactone, acetic acid, citric acid, malic acid, fumaric acid or mixtures of the same.

5. The method of claim 1 wherein said sour cream mix is acidified with lactic acid.

6. The method of claim 1 wherein said sour cream mix is acidified with lactic acid and acetic acid.

References Cited

UNITED STATES PATENTS 3,235,387 2/1966 Stumbo et al. _____ 99—59
3,340,066 9/1967 Corbin et al. _____ 99—54

FOREIGN PATENTS 102,918 11/1953 Netherlands.
1,144,091 2/1963 Germany.

OTHER REFERENCES

Litchfield J. H.: Use Stabilizer and Acid to Replace Bacteria in Making Sour Cream Buttermilk. Food Processing, May 1964 (pp. 130–132).

A. LOUIS MONACELL, Primary Examiner

D. M. NAFF, Assistant Examiner

U.S. Cl. X.R.

99—59